US008020905B2

(12) United States Patent
Nakayama

(10) Patent No.: US 8,020,905 B2
(45) Date of Patent: Sep. 20, 2011

(54) ENGAGING AND FIXING STRUCTURE AND ENGAGING AND FIXING METHOD

(75) Inventor: Tadayoshi Nakayama, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 11/711,639

(22) Filed: Feb. 28, 2007

(65) Prior Publication Data

US 2007/0204660 A1 Sep. 6, 2007

(30) Foreign Application Priority Data

Mar. 1, 2006 (JP) ................................ 2006-054889

(51) Int. Cl.
*B60R 19/52* (2006.01)
(52) U.S. Cl. ...................................................... 293/115
(58) Field of Classification Search .................. 293/115, 293/142; 180/68.6; 296/1.08; 411/508
See application file for complete search history.

(56) References Cited

U.S. PATENT DOCUMENTS

| 4,108,527 | A | * | 8/1978 | Douty et al. | 439/465 |
|---|---|---|---|---|---|
| 4,354,566 | A | * | 10/1982 | Yuda | 180/68.6 |
| 4,645,250 | A | * | 2/1987 | Bauer et al. | 293/115 |
| 4,966,245 | A | * | 10/1990 | Pfister | 180/68.6 |
| 5,108,138 | A | * | 4/1992 | Kawaguchi | 293/120 |
| 5,322,456 | A | * | 6/1994 | Yagi et al. | 439/595 |
| 5,391,092 | A | * | 2/1995 | Sumida | 439/470 |
| 5,418,875 | A | * | 5/1995 | Nakano et al. | 385/77 |
| 6,010,169 | A | * | 1/2000 | Cox et al. | 293/120 |
| 6,135,517 | A | * | 10/2000 | Cordebar | 293/155 |
| 6,220,763 | B1 | * | 4/2001 | Stephenson | 385/73 |
| D447,116 | S | * | 8/2001 | Zhu et al. | D13/133 |
| 6,322,115 | B1 | * | 11/2001 | Devilliers | 293/142 |
| 6,422,643 | B1 | * | 7/2002 | Pease | 296/193.1 |
| 6,527,317 | B2 | * | 3/2003 | Fox et al. | 293/115 |
| 6,592,164 | B2 | * | 7/2003 | Nagae et al. | 296/29 |
| D488,778 | S | * | 4/2004 | Ushiro et al. | D13/133 |
| 6,715,764 | B2 | * | 4/2004 | Delavalle et al. | 296/191 |
| 6,948,753 | B2 | * | 9/2005 | Yoshida et al. | 296/1.08 |
| 7,090,265 | B2 | * | 8/2006 | Otte | 293/115 |
| 7,152,915 | B2 | * | 12/2006 | Diehl et al. | 296/193.1 |
| 7,311,352 | B2 | * | 12/2007 | Flotzinger | 296/193.1 |
| 7,325,861 | B2 | * | 2/2008 | Zacheiss et al. | 296/187.09 |
| 7,354,082 | B2 | * | 4/2008 | Sakamoto et al. | 293/115 |
| 7,686,266 | B2 | * | 3/2010 | Torigoe et al. | 248/222.12 |

FOREIGN PATENT DOCUMENTS

| JP | 56031845 A | * | 3/1981 |
|---|---|---|---|
| JP | 5-76907 U | | 10/1993 |
| JP | 6-8110 U | | 2/1994 |
| JP | 2003-205803 A | | 7/2003 |

* cited by examiner

*Primary Examiner* — Kiran B. Patel
(74) *Attorney, Agent, or Firm* — Foley & Lardner LLP

(57) ABSTRACT

A bumper is provided with to-be-engaged projections, a radiator grille is provided with engaging projections. The radiator grille is allowed to move and approach bumper rearward of a vehicle. According to this configuration, the engaging projections engage the to-be-engaged projections and they are engaged with and fixed to each other. At this time, a bumper-side seizing unit of the bumper is fitted into a grille-side seizing unit of the radiator grille, thereby limiting the vertical direction. In an engaged state between the engaging projections and the to-be-engaged projections, an inclining surface of one of the engaging projections comes into contact with a rearward inclining surface of the one of the to-be-engaged projections, and an inclining surface of the other engaging projection is separated from a rearward inclining surface of the other to-be-engaged projection.

3 Claims, 10 Drawing Sheets

ENGAGING AND FIXING STRUCTURE AND ENGAGING AND FIXING METHOD

BACKGROUND OF THE INVENTION

1. Field of the Invention

The present invention relates to an engaging and fixing structure and an engaging and fixing method in which a first member and a second member are moved to approach each other, a first engaging unit provided on the first member and a second engaging unit provided on the second member are engaged with each other, thereby engaging and fixing the first and second members with and to each other.

2. Description of the Related Art

Conventionally, there is a known structure for mounting one resin part on the other resin part. In this structure, the one resin part is provided with an engaging projection and the other resin part is provided with an engaging hole. The one resin part is moved to approach the other resin part, and the engaging projection is inserted into the engaging hole to engage the resin parts each other (see Japanese Patent Application Laid-open No. 2003-205803).

SUMMARY OF THE INVENTION

In the conventional engaging and fixing structure of the resin part, however, since the engaging projection is inserted into the engaging hole and the positioning in the inserting direction is carried out, there is an adverse possibility that an engaged portion between the engaging projection and engaging hole is damaged, for example, when an impact force is applied to the one resin part in the inserting direction. Accordingly, improvement is required.

Therefore, in a structure for engaging and fixing one member with and to the other member by means of an engaging unit, it is an object of the present invention to prevent the engaging unit from being damaged when an external force is applied to the one member or the other member.

The most essential feature of an engaging and fixing structure according to the present invention is that a first member is provided with a first engaging unit, a second member is provided with a second engaging unit, the first member and the second member are allowed to move and approach each other, thereby bringing the first engaging unit and the second engaging unit into engagement with each other so that the first member and the second member are engaged with and fixed to each other. The first engaging unit of the first member and the second engaging unit of the second member respectively comprise a first engaging projection and a second engaging projection which project in a direction intersecting with the approaching and moving direction and in directions opposed to each other. A limiting unit is provided for limiting movement in a separating direction which is opposite from a projecting direction of each of the first engaging projection and the second engaging projection of the first member and the second member, and opposed surfaces of the first engaging projection and the second engaging projection are inclined, as inclining surface, from a front side toward a rear side in the approaching and moving direction from a tip end side to a base end side of the one engaging projection.

BRIEF DESCRIPTION OF THE DRAWINGS

FIGS. 8A and 8B are explanatory diagrams showing an initial state where an impact input rearward of the vehicle is applied to the bumper with respect to FIGS. 6A and 6B, wherein FIG. 8A shows one engaging projection and one to-be-engaged projection, and FIG. 8B shows the other engaging projection and other to-be-engaged projection;

DETAILED DESCRIPTION OF THE PREFERRED EMBODIMENTS

Embodiments of the present invention will be explained below with reference to the accompanying drawings.

Figure 1:
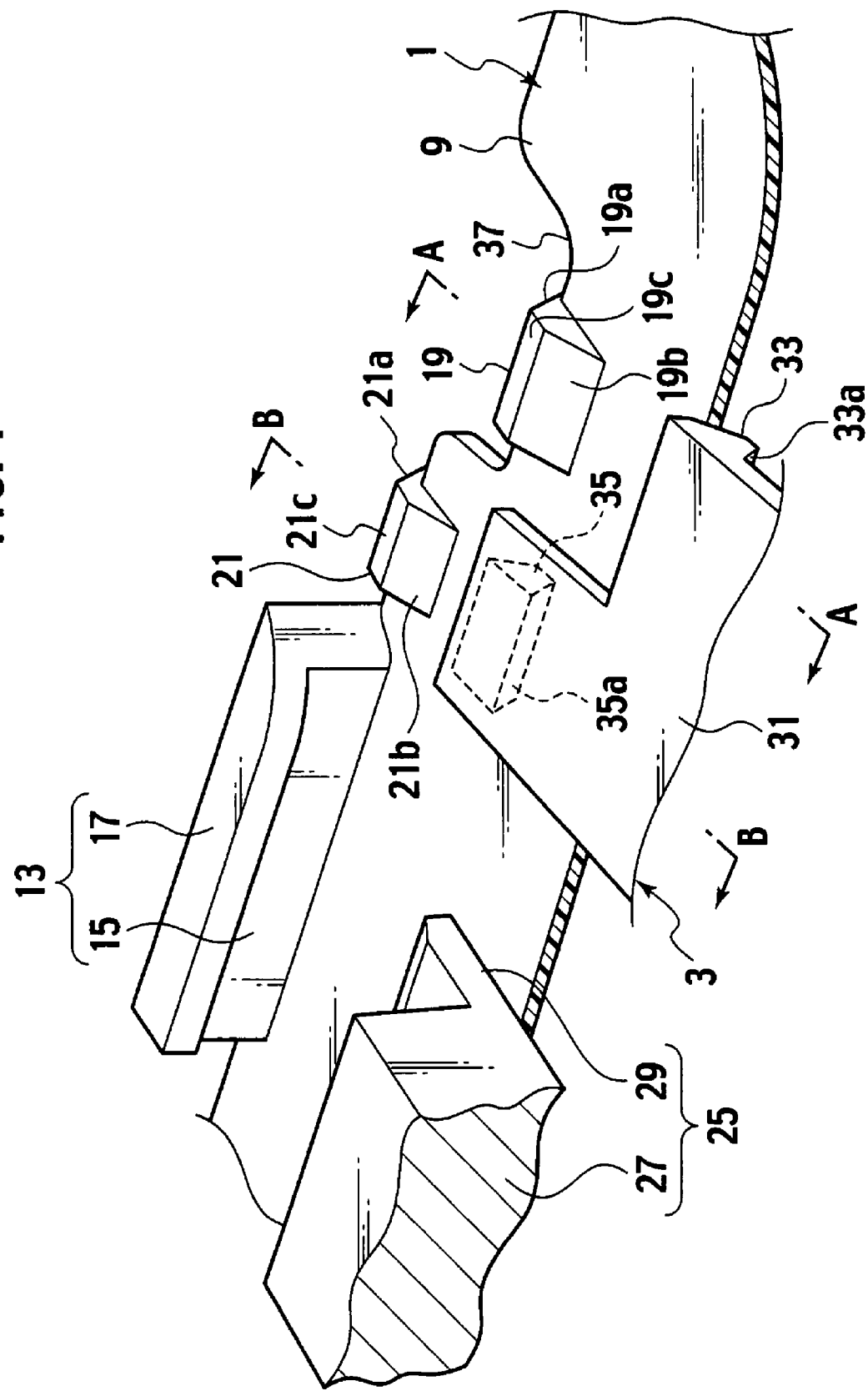
FIG. 1 is a perspective view of an engaging and fixing structure of an embodiment of the present invention, as viewed from a left and upper direction of a front side of the vehicle body.
Figure 2:
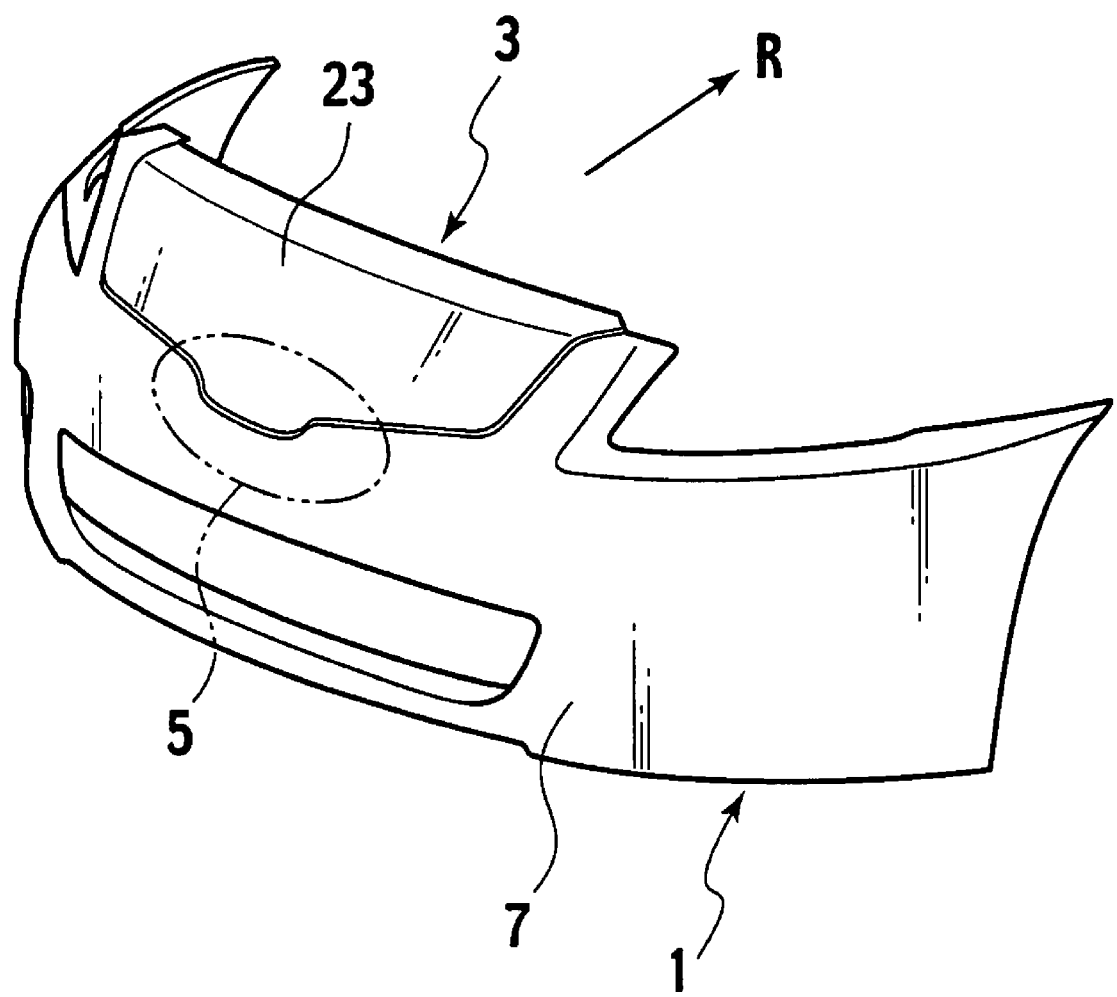
FIG. 2 is a perspective view showing a state where a resin radiator grille is engaged with and fixed to a resin bumper in the front portion of the vehicle body of an automobile.

FIG. 1 is a perspective view showing an engaging and fixing structure (before engagement) between a bumper 1 and a radiator grille 3 of an automobile according to an embodiment of the present invention, as viewed from a left and upper direction of a front side of the vehicle body. As shown in FIG. 2, according to this engaging and fixing structure, a resin bumper 1 to be mounted on a front portion of a vehicle body of an automobile and a radiator grille 3 to be mounted on a central upper portion of the bumper 1 in the vehicle widthwise direction are engaged with and fixed to each other by means of an engaging and fixing unit 5. The radiator grille 3 which is a first member is moved to approach the bumper 1 which is a second member toward a rear side of the vehicle body shown with arrow R in FIG. 2, and with this configuration, these members are engaged with and fixed to each other.

Figure 3A:
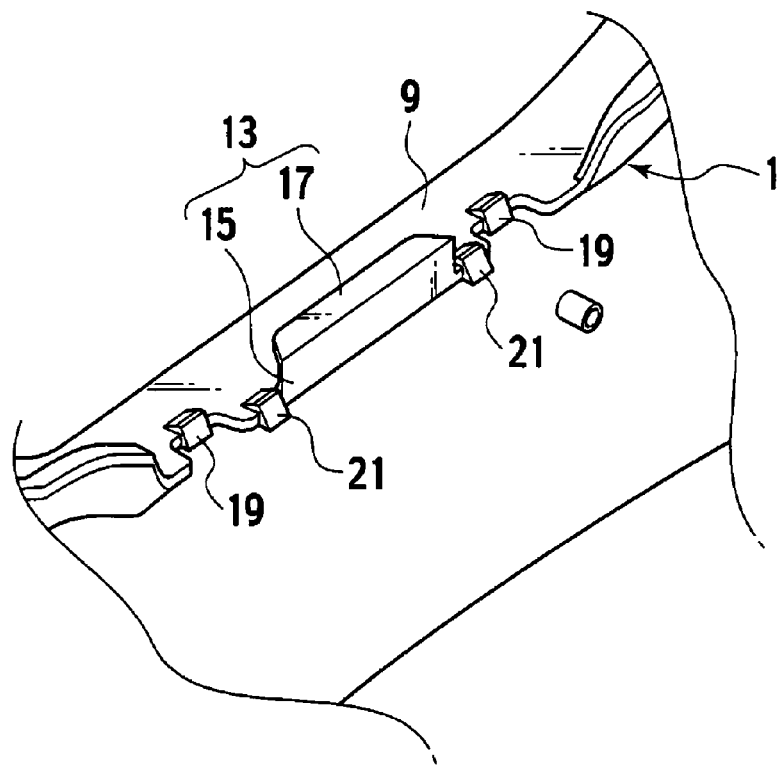
FIG. 3A is a perspective view of a back side of the bumper in the engaging and fixing unit, as viewed from a left and upper direction of the rear side of the vehicle body.
Figure 3B:
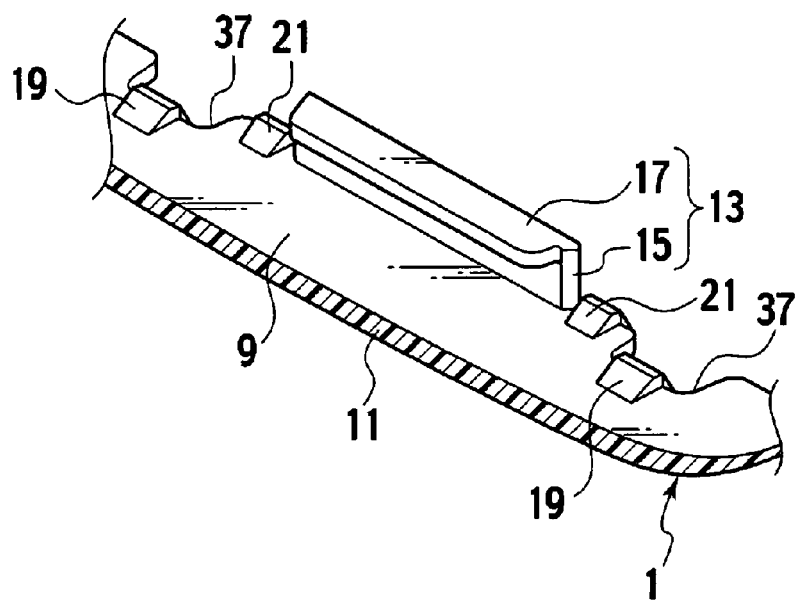
FIG. 3B is a perspective view of the same portion, as viewed from the left and upper direction of the front side of the vehicle body.
Figure 4A:
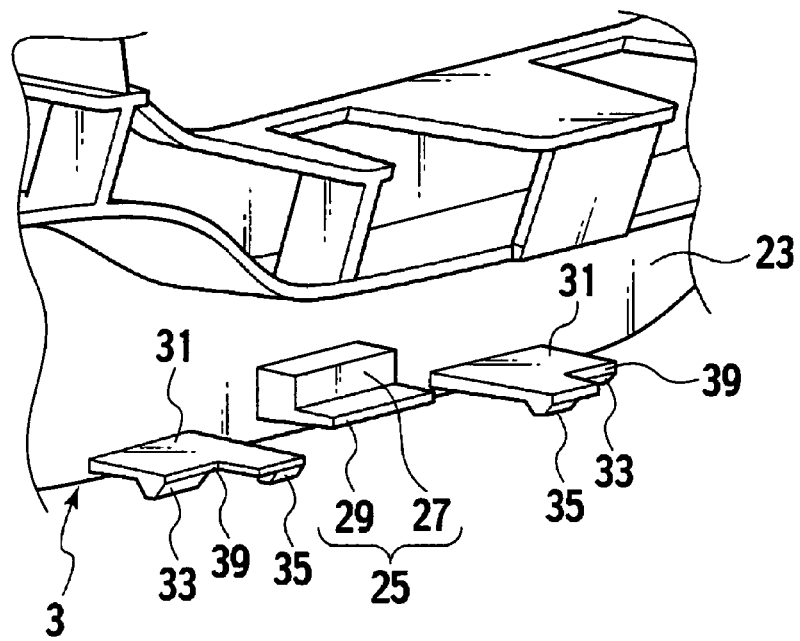
FIG. 4A is a perspective view of the back side of the radiator grille in the engaging and fixing unit, as viewed from a left and upper direction of a rear side of the vehicle body.
Figure 4B:
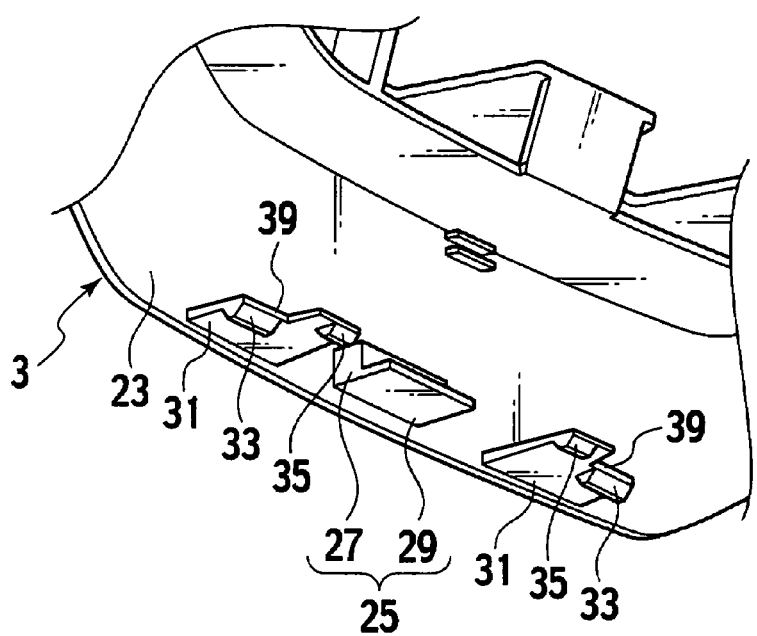
FIG. 4B is a perspective view of the same portion, as viewed from a left and lower direction of the rear side of the vehicle body.

FIG. 3A is a perspective view of a back side of the bumper 1 in the engaging and fixing unit 5, as viewed from a left and upper direction of a rear side of the vehicle body. FIG. 3B is a perspective view of the same portion, as viewed from the left and upper direction (the same direction as that of the FIG. 1) of the front side of the vehicle body. FIG. 4A is a perspective view of the back side of the radiator grille 3 in the engaging and fixing unit 5, as viewed from a left and upper direction of a rear side of the vehicle body. FIG. 4B is a perspective view of the same portion, as viewed from a left and lower direction of the rear side of the vehicle body.

As shown in FIGS. 3A and 3B, according to the bumper 1 shown in FIG. 2, a back surface of a bumper main body 7 located at a lower portion front surface of the vehicle body is provided with an engaging unit installing plate 9 which is integrally formed continuously with a rear portion of the vehicle body. In the engaging unit installing plate 9, a connection 11 shown with inclined lines in FIG. 3B is integrally connected to the bumper main body 7 with respect to the back surface of the bumper main body 7, and the bumper main body 7 and the engaging unit installing plate 9 are integrally formed of resin through the connection 11.

A bumper-side seizing unit 13 as a limiting unit is provided on a central portion of a rear end of the vehicle body of the engaging unit installing plate 9 in the widthwise direction. The bumper-side seizing unit 13 limits movement in a separating direction in the vertical direction of the vehicle body between the bumper 1 and the radiator grille 3 at the engaging and fixing unit 5 in a state where the bumper 1 and the radiator grille 3 are engaged with and fixed to each other.

The bumper-side seizing unit 13 includes a vertical wall 15 which rises upward from a rear end of the vehicle body of the engaging unit installing plate 9, and a limiting plate 17 extending toward the front side of the vehicle body from an upper end of the vertical wall 15. To-be-engaged projections 19 and 21 constituting a pair of second engaging projections as second engaging units are provided on left and right both sides of the bumper-side seizing unit 13 in the widthwise direction in the engaging unit installing plate 9 such that the to-be-engaged projections 19 and 21 project upward of the vehicle body.

Meanwhile, as shown in FIG. 4, the radiator grille 3 is provided with a grille-side seizing unit 25 at a lower portion of a back surface of a grille main body 23 which constitutes a front surface of the vehicle body. The grille-side seizing unit 25 constitutes a limiting unit together with the bumper-side seizing unit 13. The grille-side seizing unit 25 is located at a central portion of the lower portion of the back surface in the widthwise direction of the vehicle.

The grille-side seizing unit 25 includes a block 27 which is integrally formed on a back surface of the grille main body 23, and an engaging plate 29 extending rearward of the vehicle body from a lower portion of the block 27. The engaging plate 29 enters a lower portion of the limiting plate 17 of the bumper-side seizing unit 13 in a state where the radiator grille 3 is engaged with and fixed to the bumper 1 by the engaging and fixing unit 5, thereby limiting movements of the bumper 1 and the radiator grille 3 in the separating direction in the vertical direction of the vehicle body by the engaging and fixing unit 5.

Tongue pieces 31 are integrally provided on the back surface of the grille main body 23 on left and right both sides of the grille-side seizing unit 25 in the width wise direction of the vehicle. The tongue piece 31 projects rearward of the vehicle body, and can elastically deform. Engaging projections 33 and 35 constituting a pair of first engaging projections as first engaging units are provided on lower portions of the tip ends of the tongue pieces 31 such as to project downward of the vehicle body.

The left and right to-be-engaged projections 19 and 21 on the side of the bumper 1 shown in FIG. 3 are provided laterally symmetrically with respect to the bumper-side seizing unit 13, and the left and right engaging projections 33 and 35 of the radiator grille 3 corresponding thereto are also provided laterally symmetrically with respect to the grille-side seizing unit 25.

The to-be-engaged projection 21 of the pair of to-be-engaged projections 19 and 21 on the side of the bumper 1 that is located on the inner side in the widthwise direction of the vehicle is located adjacent to a side of the bumper-side seizing unit 13 in the widthwise direction of the vehicle, and the to-be-engaged projection 19 located on the outer side in the widthwise direction of the vehicle is closer to a front of the vehicle body in the longitudinal direction than the to-be-engaged projection 21. That is, the engaging unit installing plate 9 provided with the to-be-engaged projections 19 and 21 is provided at a side of the to-be-engaged projection 21 with a notch 37, and the to-be-engaged projection 19 is provided in correspondence with the notch 37.

To correspond to the to-be-engaged projections 19 and 21, the engaging projection 33 of the pair of engaging projections 33 and 35 in the radiator grille 3 that is located on the outer side in the widthwise direction of the vehicle is located closer to a front of the vehicle in the longitudinal direction than the engaging projection 35 located on the inner side. That is, the tongue piece 31 provided with the engaging projections 33 and 35 is provided at a side of the engaging projection 35 with a notch 39, and the engaging projection 33 is provided in correspondence with the notch 39.

Figure 5A:
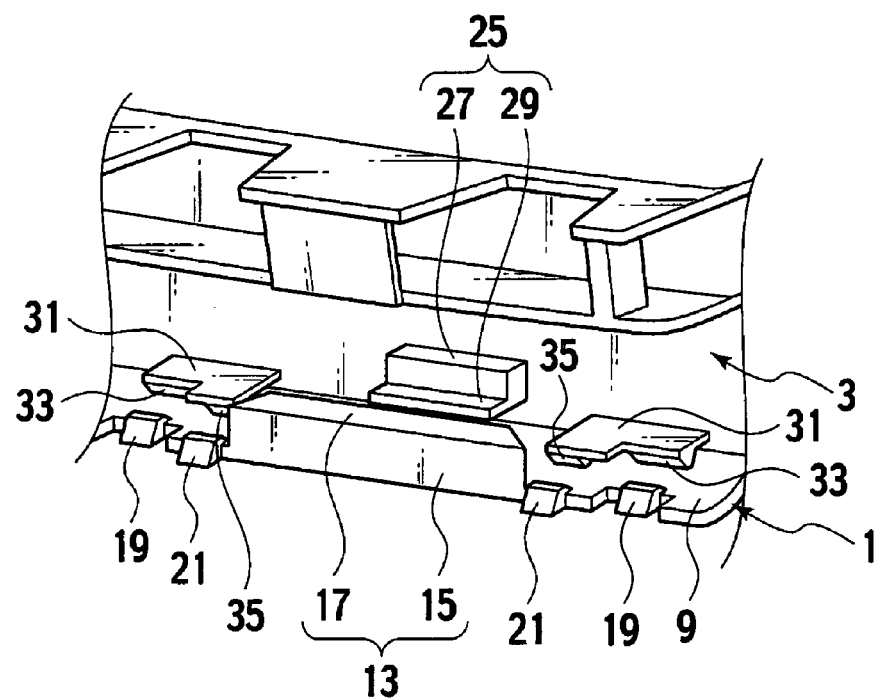
FIG. 5A is a perspective view of the back surface of the engaging and fixing unit before the bumper and the radiator grille are engaged with and fixed to each other, as viewed from a right and upper direction of the rear side of the vehicle body.
Figure 5B:
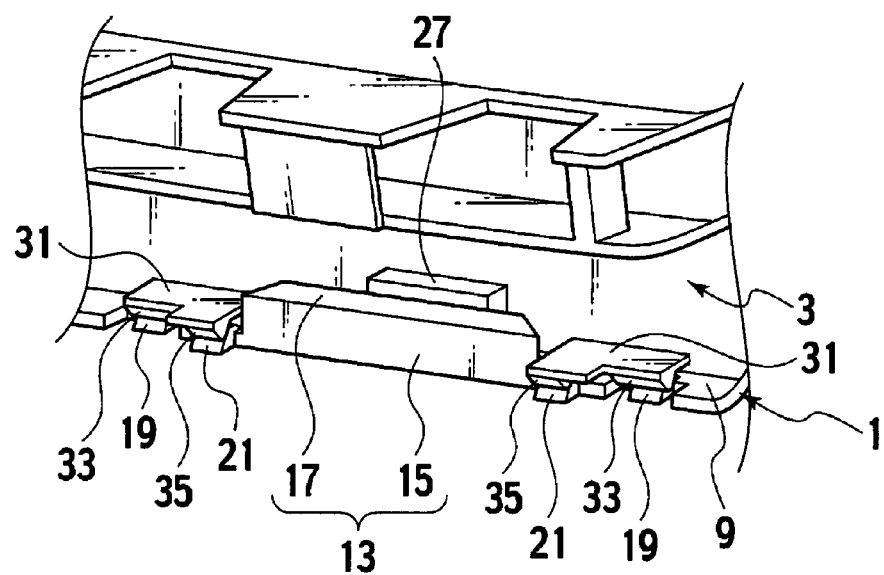
FIG. 5B is a perspective view after the bumper and the radiator grille are engaged with and fixed to each other.

FIG. 5A is a perspective view of a back surface of the engaging and fixing unit 5 before the bumper 1 and the radiator grille 3 are engaged with and fixed to each other, as viewed from a right and upper direction of rear portion of the vehicle body. FIG. 5B is a perspective view after the bumper 1 and the radiator grille 3 are engaged with and fixed to each other. If the radiator grille 3 is moved rearward of the vehicle body with respect to the bumper 1 from the state shown in FIG. 5A, the engaging projections 33 and 35 of the radiator grille 3 engage the to-be-engaged projections 19 and 21 of the bumper 1, the engaging plate 29, which is not illustrated in FIGS. 5A and 5B, enters the lower portion of the limiting plate 17 of the bumper 1, and the radiator grille 3 is mounted on the bumper 1.

Figure 6A:
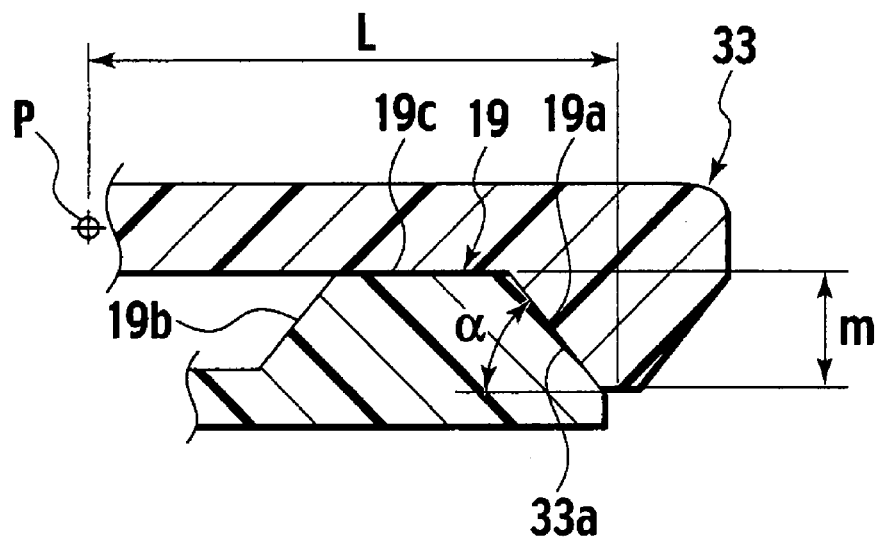
FIG. 6A is a sectional view of a state where the bumper and the radiator grille are engaged with and fixed to each other taken along the line A-A in FIG. 1.
Figure 6B:
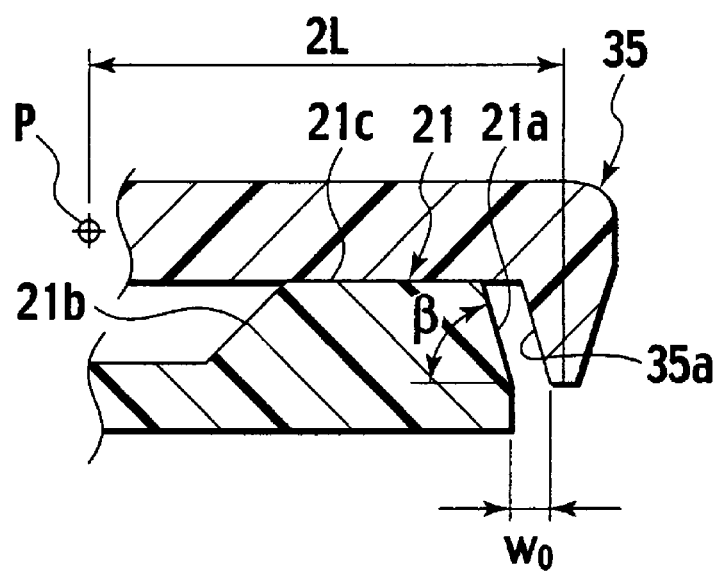
FIG. 6B is a sectional view taken along the line B-B in FIG. 1.

FIG. 6A is a sectional view of a state where the bumper 1 and the radiator grille 3 are engaged with and fixed to each other taken along the line A-A in FIG. 1. FIG. 6B is a sectional view taken along the line B-B in FIG. 1.

As shown in FIG. 6A, the to-be-engaged projection 19 on the side of the bumper 1 includes a rearward inclining surface 19a located on the rear side of the vehicle body, a forward inclining surface 19b located on the front side of the vehicle body, and a flat surface 19c located between upper ends of the rear and forward inclining surfaces 19a and 19b.

The rearward inclining surface 19a inclines at an angle α (approximately 45°) with respect to the horizontal plane, and the forward inclining surface 19b inclines at almost the same angle with respect to the horizontal plane.

The engaging projection 33 on the side of the radiator grille 3 which engages the to-be-engaged projection 19 includes an inclining surface 33a corresponding to the rearward inclining surface 19a of the to-be-engaged projection 19.

The rearward inclining surface 19a of the to-be-engaged projection 19 and the inclining surface 33a of the engaging projection 33 are in contact with each other.

That is, in a state where the engaging projections 33 and 35 are located on the front side in the approaching direction of the to-be-engaged projections 19 and 21 shown with arrow R in FIG. 2, opposed surfaces (the rearward inclining surface 19a and the inclining surface 33a) of the one engaging projection 33 and the one to-be-engaged projection 19 are inclining surfaces which incline from the front side to the rear side in the approaching direction from the tip end side to the base end side of the one engaging projection 33, and the inclining surfaces are substantially in contact with each other.

As shown in FIG. 6B, the to-be-engaged projection 21 on the side of the bumper 1 includes a rearward inclining surface 21a on the rear side of the vehicle body, a forward inclining surface 21b on the front side of the vehicle body, and a flat surface 21c located between upper ends of the rear and forward inclining surface 21a and 21b.

The rearward inclining surface 21a inclines at an angle β (approximately 75°) with respect to the horizontal plane, and the forward inclining surface 21b inclines at approximately 45° with respect to the horizontal plane.

The engaging projection 35 on the side of the radiator grille 3 which engages the to-be-engaged projection 21 includes an inclining surface 35a corresponding to the rearward inclining surface 21a of the to-be-engaged projection 21.

The angle β between the rearward inclining surface 21a and the inclining surface 35a can be 90°. That is, the angle β can be in a range from approximately 75° to 90°.

The rearward inclining surface 21a of the to-be-engaged projection 21 and the inclining surface 35a of the engaging projection 35 are separated from each other by a size w0.

That is, in a state where the engaging projections 33 and 35 are located on the front side in the approaching and moving direction shown with arrow R in FIG. 2 of the to-be-engaged projections 19 and 21, the opposed surfaces (the rearward inclining surface 21a and the inclining surface 35a) of the other engaging projection 35 and the other to-be-engaged projection 21 are separated from each other.

The tongue pieces 31 having the engaging projections 33 and 35 on the side of the radiator grille 3 can elastically deform. A distance 2L from a starting point P of the deformation (corresponding to a connected position between the tongue piece 31 and the grille main body 23) to the engaging projection 35 is two times longer than a distance L from the starting point P to the engaging projection 33.

Figure 7A:
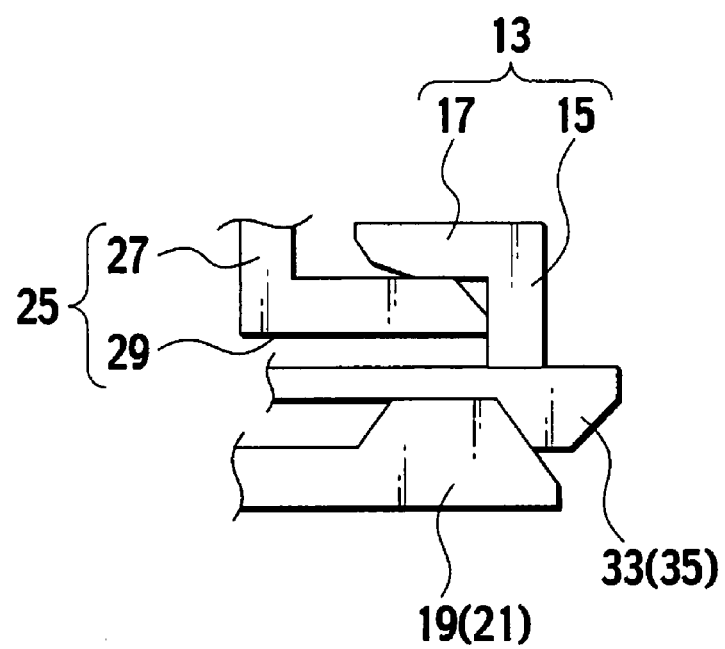
FIG. 7A is a schematic side view showing a positional relationship in the vertical direction of a seizing state between a bumper-side seizing unit and a grille-side seizing unit, and an engaging state between the engaging projection and the to-be-engaged projection.

FIG. 7A is a schematic side view showing a positional relationship in the vertical direction of a seizing state between the bumper-side seizing unit 13 and the grille-side seizing unit 25, and an engaging state between the engaging projection 33 (35) and the to-be-engaged projection 19 (21). The grille-side seizing unit 25 of the radiator grille 3 and the engaging projection 33 (35) are sandwiched between the bumper-side seizing unit 13 of the bumper 1 and the to-be-engaged projection 19 (21) from above and below.

Figure 7B:
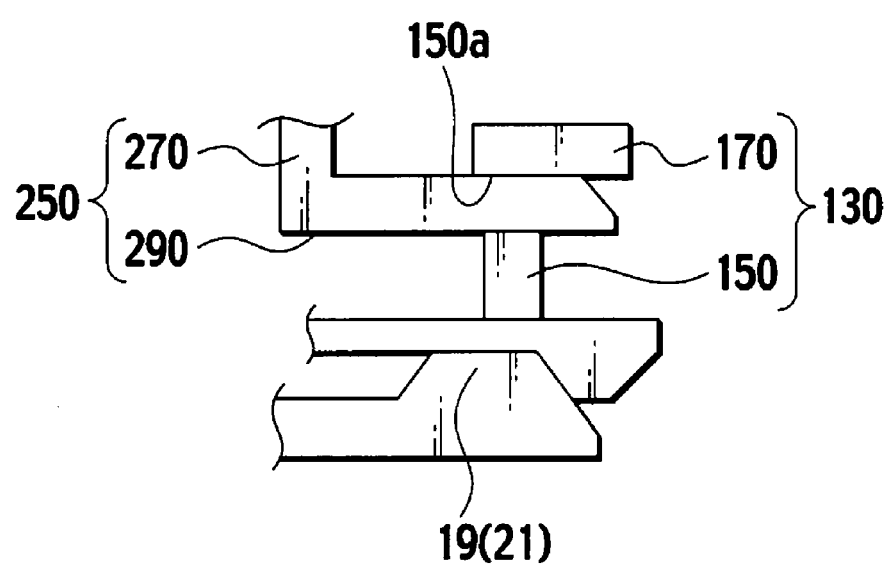
FIG. 7B is a side view showing a modification of FIG. 7A.

FIG. 7B shows a modification of FIG. 7A. In the modification, a vertical wall 150 of a bumper-side seizing unit 130 is provided with a through hole 150a, and an engaging plate 290 of a grille-side seizing unit 250 is inserted into the through hole 150a. A symbol 170 represents a limiting plate of the bumper-side seizing unit 130, and a symbol 270 represents a block of the grille-side seizing unit 250.

Figure 8A:
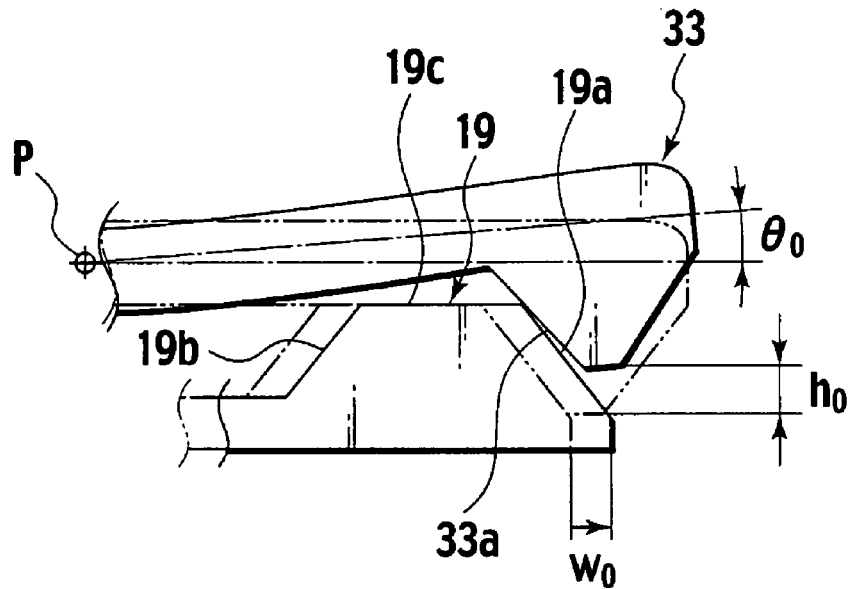
Figure 8B:
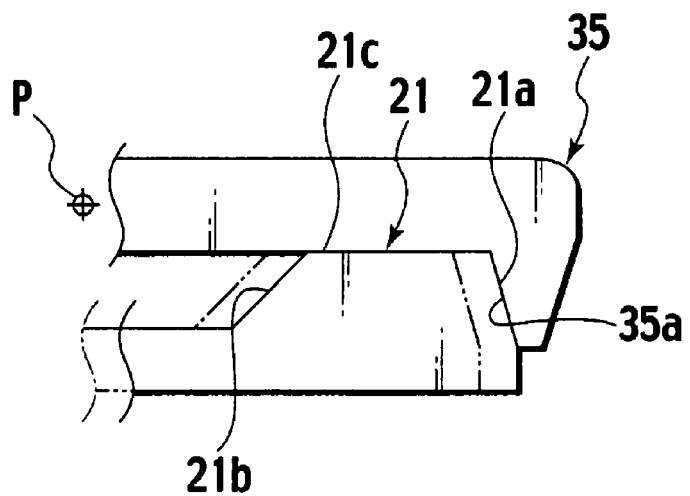
Figure 9A:
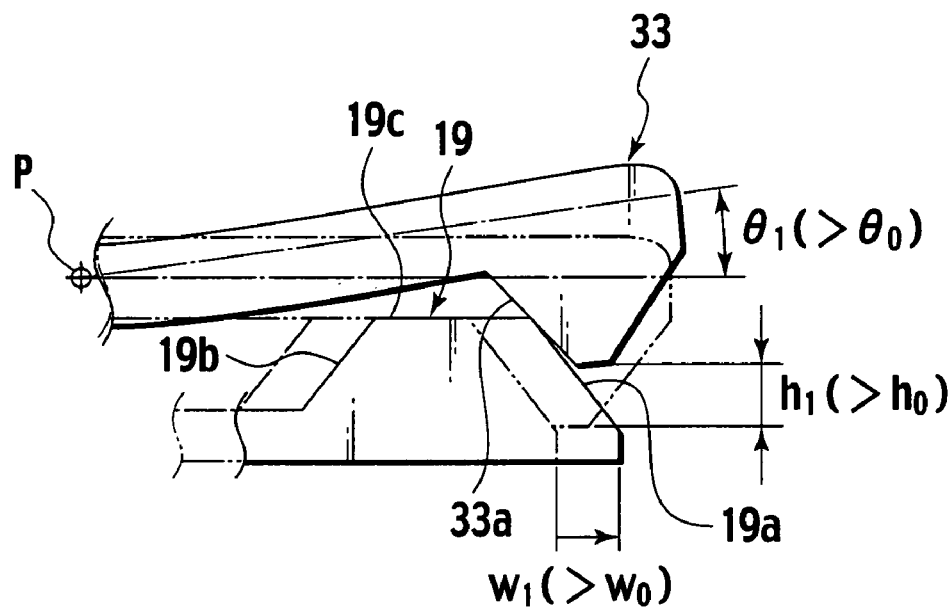
FIGS. 9A and 9B are explanatory diagrams showing a state where the impact input rearward of the vehicle is further applied to the bumper from the state shown in FIGS. 8A and 8B.
Figure 9B:
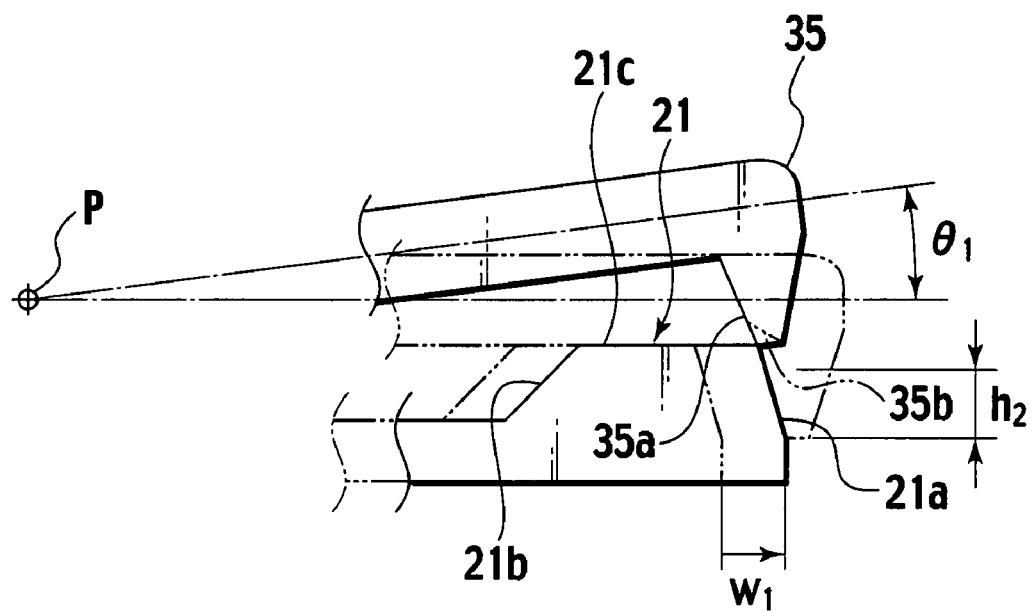
Figure 10A:
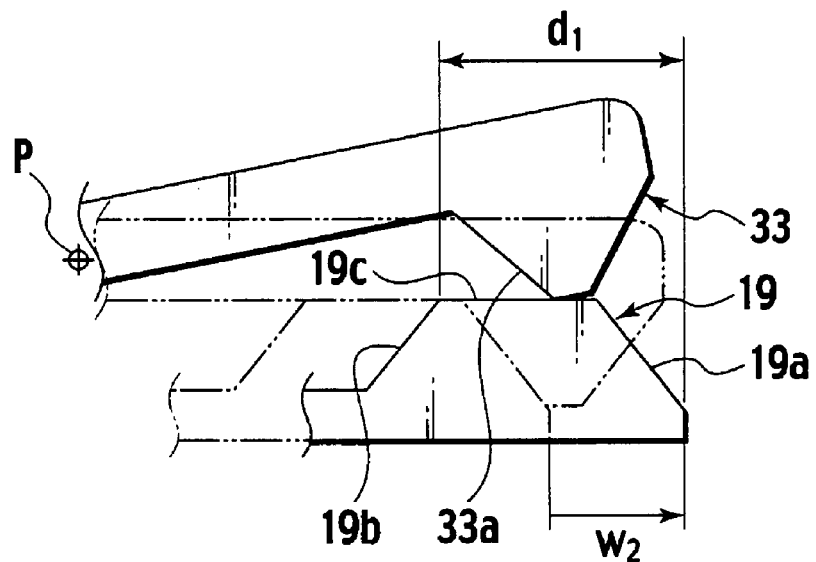
FIGS. 10A and 10B are explanatory diagrams showing a state where the impact input rearward of the vehicle is further applied to the bumper from the state shown in FIGS. 9A and 9B and the engaged state of the engaging unit is released.
Figure 10B:
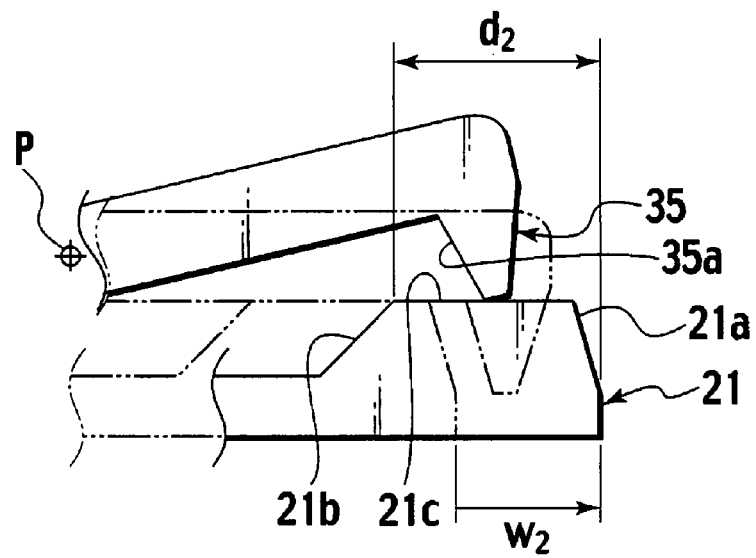

Next, the operation will be explained. The following explanation is based on an assumption that an external force is applied to the bumper 1 shown in FIG. 2, as an impact force, toward the rear side of the vehicle body shown with arrow R from the front side of the vehicle body. States of various portions at this time are shown in FIGS. 8 to 10. FIGS. 8A, 9A, and 10A correspond to FIG. 6A, and FIGS. 8B, 9B, and 10B correspond to FIG. 6B.

If the external force is applied to the bumper 1 in the states shown in FIGS. 6A and 6B, the rearward inclining surface 19a of the to-be-engaged projection 19 of the bumper 1 pushes the inclining surface 33a of the engaging projection 33 of the radiator grille 3 as shown in FIG. 8A, and each the tongue piece 31 elastically deforms such that the engaging projection 33 is displaced upward along the rearward inclining surface 19a of the to-be-engaged projection 19. At this time, each the tongue piece 31 at a location where the engaging projection 33 is located is displaced by an angle θ with respect to the state shown in FIGS. 6A and 6B, and the engaging projection 33 is moved and displaced upward by a size h0.

At this time, the to-be-engaged projection 19 of the bumper 1 moves rearward of the vehicle body by a size w0. With this configuration, the rearward inclining surface 21a of the to-be-engaged projection 21 in the bumper 1 abuts against the inclining surface 35a of the engaging projection 35 in the radiator grille 3 as shown in FIG. 8B, and with this configuration, momentum applied to the bumper 1 by the external force is suppressed. In a state shown in FIG. 8B, the engaging projection 35 is not displaced upward, but in the reality, after the rearward inclining surface 21a abuts against the inclining surface 35a, the engaging projection 35 is displaced upward by about an angle θ0 like the engaging projection 33 shown in FIG. 8A.

If the to-be-engaged projection 19 of the bumper 1 then moves from the state shown in FIG. 6A by a size w1 (>θ0) as shown in FIG. 9A, the tongue piece 31 where the one engaging projection 33 of the radiator grille 3 is located is displaced from the state shown in FIG. 6A by the angle θ1 (>θ0) and is more largely elastically deformed, and the engaging projection 33 is located higher than the state shown in FIG. 6A by a size h1 (>h0). As the tongue piece 31 elastically deforms, the tongue piece 31 where the other engaging projection 35 of the radiator grille 3 is located is also displaced from the state shown in FIG. 6B by an angle θ1 (>θ0) as shown in FIG. 9B, and the engaging projection 35 is moved and displaced higher than the state shown in FIG. 6B by a size h2 (>h0).

At this time, since the engaging projection 35 has a longer distance from the starting point P than the engaging projection 33, the upward moving amount of the engaging projection 35 becomes greater than that of the engaging projection 33 (h2>h1), the vertical position of the lower end of the engaging projection 35 is substantially equal to or slightly higher than the flat surface 21c of the to-be-engaged projection 21, and the engaged state between the engaging projection 35 and the to-be-engaged projection 21 is released.

This engagement is released when a distance between the engaging projections 33 and 35 and the starting point P is set such that a vertical size m between the lower end of the engaging projection 33 and the flat surface 19c of the to-be-engaged projection 19 in FIG. 6A, and a vertical size h2 between the lower end of the engaging projection 35 in FIG. 8B and the lower end of the engaging projection 35 in FIG. 9B establish a relation of h2>m.

If h2<m, an inner side of the lower end of the engaging projection 35 is formed with a chamfered portion 35b as shown with a phantom line in FIG. 9B. With this configuration, when the engaging projection 35 is displaced to a solid line position from the phantom line position as shown in FIG. 9B, even when the lower end of the engaging projection 35 is located at a lower position than the flat surface 21c of the to-be-engaged projection 21, the chamfered portion 35b comes into contact with the to-be-engaged projection 21 and is guided, and the engaging projection 35 can ride on the flat surface 21c of the to-be-engaged projection 21 as shown in FIG. 10B (described later).

If the bumper 1 is further moved rearward of the vehicle body from the state shown in FIGS. 9A and 9B and is retreated from the initial state shown in FIGS. 6A and 6B by a size w2, the engaging projections 33 and 35 of the radiator grille 3 ride on the flat surfaces 19c and 21c of the to-be-engaged projections 19 and 21 of the bumper 1 as shown in FIGS. 10A and 10B. With this configuration, the engagements between the to-be-engaged projections 19 and 21 on the side of the bumper 1 and the engaging projections 33 and 35 on the side of the radiator grille 3 are completely released and opened.

If application the impact force on the bumper 1 is released from the state shown in FIGS. 10A and 10B, the elastically deformed tongue piece 31 is restored, and the tongue piece 31 is returned to the initial state shown in FIGS. 6A and 6B from the state shown in FIGS. 10A and 10B through the states shown FIGS. 8 and 9. When the displacement amount w2 of the bumper 1 at this time is smaller than an elastic limit displacement amount f, the tongue piece tries to return to its original state when the external input is released.

At this time, if a distance from a tip end of the to-be-engaged projection 21 to a boundary between the flat surface 21c and the reversely inclining surface 21b is defined as d2, the flat surface 21c is set such that the relation of d2>f is established. With this configuration, if the bumper 1 is in the elastic limit range, the state where the engaging projection 35 is on the flat surface 21c of the to-be-engaged projection 21 can be secured, and the engaging projection 35 can be swiftly returned to the engaged state from this state. A distance d1 from the tip end of the to-be-engaged projection 19 to the boundary between the flat surface 19c and the reversely inclining surface 19b is longer than d2.

According to the present embodiment, when the bumper 1 receives the impact force acting rearward of the vehicle, the engagements between the to-be-engaged projections 19 and 21 on the side of the bumper 1 and the engaging projections 33 and 35 on the side of the radiator grille 3 are released, and if the impact force is released, they return to the original states. Therefore, it is possible to prevent the peripheries of the engaging unit from being damaged.

When the bumper 1 is pushed rearward of the vehicle from the state shown in FIGS. 10A and 10B and the engaging projections 33 and 35 are released from the flat surfaces 19c and 21c upward and come into contact with the reversely inclining surfaces (the forward inclining surfaces 19b and 21b), it is only necessary to set the d1 and d2 smaller than the elastic limit displacement amount f in FIGS. 10A and 10B. In this state, if the impact force on the bumper 1 rearward of the vehicle is released, the engaging projections 33 and 35 are moved upward along the reversely inclining surfaces (the forward inclining surfaces 19b and 21b) by the restoring force of the tongue piece 31 which is in the elastic limit range, and return to the flat surfaces 19c and 21c and return to the engagement positions.

In the present embodiment, when the engaging unit is prevented from being damaged and the returning motion is performed, a fastening tool such as a clip is not used, the cost of parts is not increased, the assembling time is not increased, and an employed part is not limited to a portion where a mounting operation of the fastening tool.

In the case of a conventional engaging structure of a resin part having an engaging hole into which an engaging projection is inserted, since there is the engaging hole, flow of molten resin is hindered during the resin forming, and the forming performance is deteriorated, but according to the present embodiment, such deterioration of the forming performance can be prevented except the case having the through hole 150a shown in FIG. 7B.

According to the present embodiment, the opposed surfaces (the inclining surface 35a and the rearward inclining surface 21a) between the other engaging projection 35 and the other to-be-engaged projection 21 are inclined in the same direction as the opposed surfaces (the inclining surface 33a and the rearward inclining surface 19a) between the one engaging projection 33 and the one to-be-engaged projection 19, and the inclination angle of the former opposed surfaces is set smaller than that of the latter opposed surfaces. Therefore, when the bumper 1 receives an impact force rearward of the vehicle, the rearward inclining surface 21a abuts against the inclining surface 35a and the impact force can efficiently be suppressed.

The pair of engaging projections 33 and 35 are provided on each of the elastically deformable tongue pieces 31. Therefore, the releasing operation of the engaged state between the to-be-engaged projections 19 and 21 on the side of the bumper 1 and the engaging projections 33 and 35 on the side of the radiator grille 3 can be carried out easily, and the returning operation from the released state to the engaged state can also be carried out easily.

The other engaging projection 35 and the other to-be-engaged projection 21 are provided forward in the approaching and moving direction (rearward of the vehicle) (in the direction of arrow R in FIG. 2) as compared with the one engaging projection 33 and the one to-be-engaged projection 19. Therefore, when the bumper 1 receives an impact rearward of the vehicle and the tongue piece 31 elastically deforms, the other engaging projection 35 and the other to-be-engaged projection 21 more largely displace upward than the one engaging projection 33 and the one to-be-engaged projection 19, and the engagement between the other engaging projection 35 and the other to-be-engaged projection 21 whose inclination angle is small and whose engaged state is not easily released can reliably be released.

The flat surfaces 19c and 21c on which the pair of engaging projections 33 and 35 ride over when the tongue pieces 31 elastically deform are continuously provided on the opposed surfaces (the rearward inclining surfaces 19a and 21a) at the tip ends of the pair of to-be-engaged projections 19 and 21 in the projecting direction. Therefore, the engaging projections 33 and 35 easily move onto the flat surfaces 19c and 21c from the state where the engaging projections 33 and 35 are in contact with the rearward inclining surfaces 19a and 21a of the to-be-engaged projections 19 and 21, and the engagement between the to-be-engaged projections 19 and 21 and the engaging projections 33 and 35 can easily be released.

The reversely inclining surfaces (the forward inclining surfaces 19b and 21b) which incline in the opposite direction from the opposed surfaces (the rearward inclining surfaces 19a and 21a) are provided on the opposed surfaces (the rearward inclining surfaces 19a and 21a) of the pair of to-be-engaged projections 19 and 21 in the opposite side from in the approaching and moving direction (arrow R in FIG. 2) continuously from the flat surfaces 19c and 21c. Therefore, even when the bumper 1 is further pushed rearward of the vehicle from the state where the engaging projections 33 and 35 are on the flat surfaces 19c and 21c and the engaging projections 33 and 35 are moved to the reversely inclining surfaces (the forward inclining surfaces 19b and 21b), the engaging projections 33 and 35 move upward along the reversely inclining surfaces, and return to the flat surfaces 19c and 21c, and can return to the engaged positions.

In the present embodiment, the radiator grille 3 approaches and moves rearward of the vehicle body shown with arrow R in FIG. 2 with respect to the bumper 1 so that the members are engaged with and fixed to each other. Conversely, the bumper 1 can be allowed to approach and move in the opposite direction from the arrow R in FIG. 2 with respect to the radiator grille 3, and the members can be engaged with and fixed to each other.

In the present embodiment, the engaging projections 33 and 35 on the side of the radiator grille 3 are provided on the tongue piece 31 so that they can elastically deform, but the to-be-engaged projections 19 and 21 on the side of the bumper 1 can be provided on the elastically deforming members such as the tongue piece 31, and they can be elastically deformed.

According to the present invention, when at least one of the first member and the second member receives a force acting in a direction opposite from an approaching and moving direction at the time of engagement, opposed surfaces of the other first engaging projection of the first member and the other second engaging projection of the second member come into contact with each other, the momentum caused by the acting force is weakened, one of the other first engaging projection and the other second engaging projection moves along the opposed surfaces with respect to the other one and at the same time, and one of the one first engaging projection of the first member and the one second engaging projection of the second member move along the opposed surfaces with respect to the other one. With this configuration, the engaged and fixed state of the engaging unit is released. Therefore, the engaging unit between the first engaging projection and the second engaging projection can be prevented from being damaged.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

The entire content of Japanese Patent Application No. TOKUGAN 2006-54889 with a filing date of Mar. 1, 2006, is hereby incorporated by reference.

What is claimed is:

1. An engaging and fixing structure, comprising:
a first member provided with a first engaging projection having a first surface that spans from a first tip end to a first base end of the first engaging projection;
a second member provided with a second engaging projection having a second surface that spans from a second tip end to a second base end of the second engaging projection; and
a limiting unit,
wherein the first surface is opposed to the second surface,
wherein when the first member and the second member are aligned opposite one another, the first member and the second member are adapted to permit the first engaging projection and the second engaging projection to be (i) moved towards each other via movement of the first member and the second member to be (ii) brought together to be (iii) in engagement with each other such that the first member and the second member are (iv) fixed to each other, when the first member and the second member are moved along a first direction that permits the first member and the second member to be engaged with and fixed to each other once the first member and the second member are brought together,
wherein the first engaging projection projects in a first projecting direction intersecting the first direction,
wherein the second engaging projection projects in a second projecting direction intersecting the first direction and opposite the first projecting direction,
wherein the limiting unit is adapted to limit movement of the second member away from the first member in a direction opposite from the first projecting direction,
wherein the limiting unit is adapted to limit movement of the second member away from the first member in a direction opposite from the second projecting direction,
wherein the first surface is inclined relative to the first direction, between the first tip end and the first base end of the first engaging projection,
wherein the second surface is inclined relative to the first direction, between the second tip end and the second base end of the second engaging projection, and
wherein when the first member and the second member are engaged with and fixed to each other, the first surface and the second surface face one another.

2. An engaging and fixing structure, comprising:
a first member provided with a first engaging means;
a second member provided with a second engaging means, the first member and the second member being allowed to move and approach each other in an approaching and moving direction, thereby bringing the first engaging means and the second engaging means into engagement with each other such that the first member and the second member are engaged with and fixed to each other,
wherein the first engaging means of the first member and the second engaging means of the second member, respectively, comprise a first engaging projection and a second engaging projection which project in a direction intersecting with the approaching and moving direction and in directions opposed to each other; and
a limiting means for limiting movement in a separating direction which is opposite from a projecting direction of each of the first engaging projection and the second engaging projection, and
wherein opposed surfaces of the first engaging projection and the second engaging projection are inclined, as inclining surfaces, from a front side toward a rear side in the approaching and moving direction from a tip end side to a base end side of the respective engaging projections.

3. An engaging and fixing method, comprising:
providing a first member with a first engaging projection, and a second member with a second engaging projection,
permitting the first member and the second member to move and approach each other in an approaching and moving direction, thereby bringing the first engaging projection and the second engaging projection into engagement with each other such that the first member and the second member are engaged with and fixed to each other,
wherein the first and second engaging projections project in a direction intersecting with the approaching and moving direction and in directions opposed to each other,
wherein a limiting unit is provided for limiting movement in a separating direction which is opposite from a projecting direction of each of the first engaging projection and the second engaging projection, and wherein opposed surfaces of the first engaging projection and the second engaging projection are inclined, as inclining surfaces, from a front side toward a rear side in the approaching and moving direction from a tip end side to a base end side of the respective engaging projections.

* * * * *